United States Patent Office 3,524,356
Patented Aug. 18, 1970

3,524,356
TORSIONAL RESTRAINING MEANS FOR GYROSCOPES
Douglas Barnett and Norman John Myall, Watford, England, assignors to S. G. Brown Limited, Watford, England, a British company
Filed June 26, 1967, Ser. No. 648,897
Int. Cl. G01c 19/02
U.S. Cl. 74—5                         16 Claims

ABSTRACT OF THE DISCLOSURE

The disclosure relates to magnetic arrangements for applying a torsional force to a rotatable body constituted as a gyroscope rotor.

The rotor described is rotatably mounted by means permitting the rotor spin axis to be angularly displaced from the axis of the torque drive by which the rotor is made to spin. The magnetic arrangements comprise a first magnetic means in the form of an annular stack of laminations set in a slot in the outer surface of the rotor for co-operation with second magnetic means constituted as a pair of flat U-shaped permanent magnets with pole faces adjacent the rotor. In one embodiment, the permanent magnets are fixed on the gyroscope housing in a position such that the magnetic forces pass through the center of suspension of the rotor, so applying a torsional restraint on the rotor if its spin axis diverges from the torque axis. In another embodiment, the magnets are movable relative to the housing by electric means in the form of a linear induction motor so that the rotor can be made to precess. Pick-off means enable the position of the permanent magnets to be precisely monitored.

---

The invention relates to means for applying a torsional restraint or a torsional force to rotatable bodies and in particular to free rotor gyroscopes in which the gyroscope rotor is mounted for rotation by means permitting angular displacement of the rotor spin axis from the axis of the torque for spinning the rotor.

Whilst freedom from restraint is normally desired for such angular movement of a gyroscope rotor, there are circumstances, for example, when the gyroscope is to be operated as a gyro compass, a vertical reference gyro, or a combination of these, or as a rate gyro, under which known restraint about a particular axis or axes at right angles to the spin axis has to be applied, In other circumstances, it is desirable to apply a torsional force to a gyroscope for example to cause it to precess. It is accordingly the major object of the present invention to provide an improved means for applying torsion forces to rotatable bodies such as gyroscope rotors.

The invention accordingly provides means for applying a torsional force to a gyro rotor mounted for rotation by means permitting angular displacement of the rotor spin axis from the axis of the torque for spinning the rotor, the torsional force applying means comprising first magnetic means carried by the rotor and second magnetic means positioned adjacent the rotor for co-acting with the first magnetic means.

In a gyroscope, the invention can thus provide a magnetic element on the gyro rotor, for example, a ring armature of ferrous laminations set into the outer rim of the rotor, and one or more permanent magnets mounted on the gyroscope casing. The permanent magnets may be fixed on the casing and the position of the magnetic elements such that the magnetic forces act through the center of suspension of the rotor when the rotor spin axis coincides with the axis of rotation of its driving shaft. There will then be no torque on the rotor. If the rotor spin axis is displaced from this position however the magnetic elements provide a restoring torque. The permanent magnets can instead be movably mounted on the casing, for example, a pair of short arcuate permanent magnets spaced diametrically around the rotor can be pivotable about an axis at right angles to the rotor drive axis and passing through the center of suspension. The magnets can be moved, as by electric means, from a neutral position in which they apply no torque to the rotor to an effective position in which a known torque is applied about the axis on which the magnets pivot. Measuring means, preferably electrical, can be provided to indicate the position of the magnets.

By way of example only, two embodiments of the invention are described below with reference to the accompanying drawings, in which.

Figure 1:
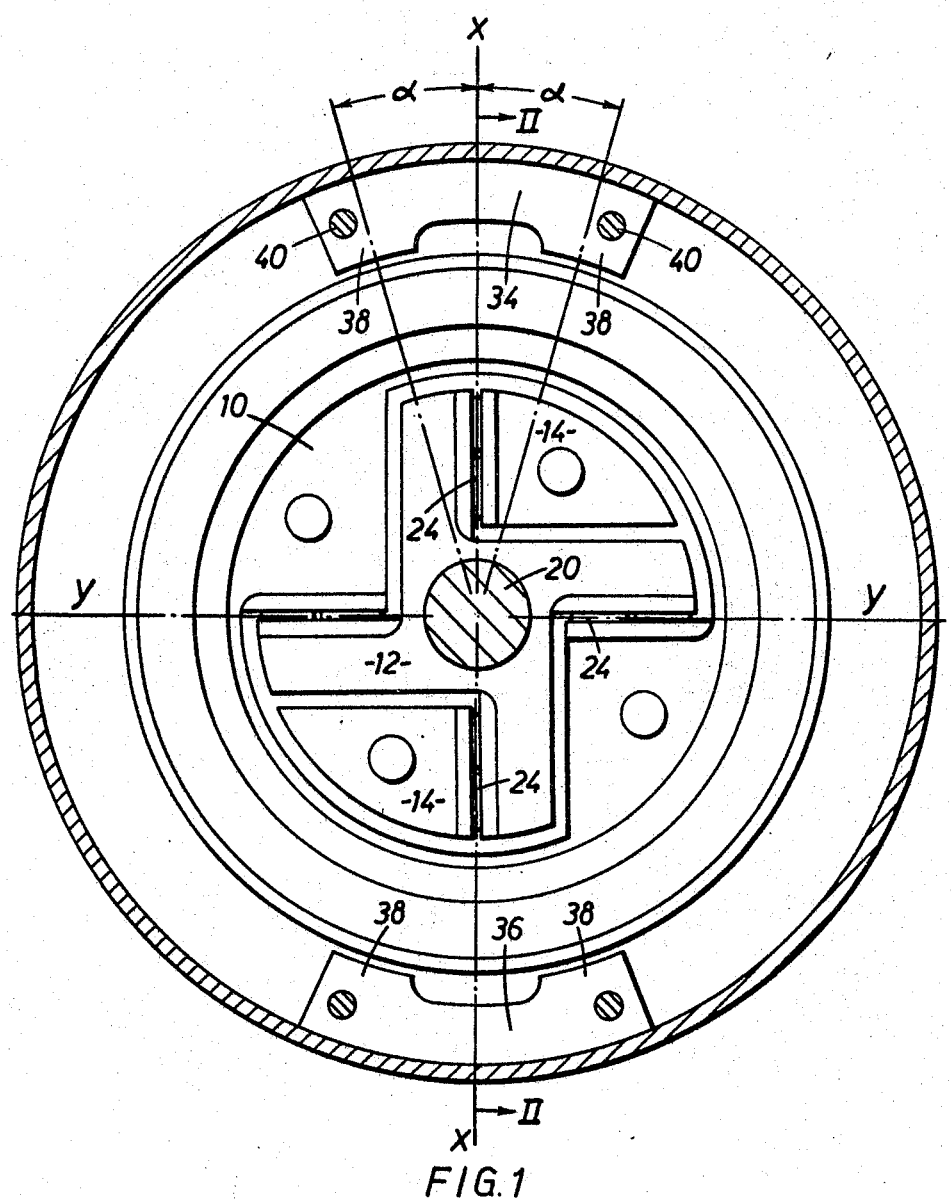
FIG. 1 is an axial sectional view of a gyroscope incorporating to the first embodiment of the invention, the view being on the line I—I of FIG. 2.

The gyro rotor assembly in both the embodiments illustrated is conducted in accordance with the disclosure of U.S. application Ser. No. 647,548 and comprises a disc-like rotor suspension assembly, the detailed form of which is not shown in FIGS. 2 and 3 for the sake of simplicity. The assembly has an outer rotor portion 10 separated by a slot from interior parts comprising a central gimbal portion 12 separated by slots from a pair of spaced mounting portions 14 between the gimbal and rotor portions, the mounting portions being rigidly secured to a diametrally extending bridge or yoke 16. The bridge 16 is axially spread from the mounting portions 14 by spacers 18 and is fixedly secured on a driving shaft 20 by a nut 22. The shaft 20 extends with clearance through a central aperture in the gimbal portion 12 to an electric motor 23, for the application of torque to the gyro assembly to rotate it at a speed at which it is theoretically decoupled from its suspension.

Two pairs of flexural spring pivots 24 on orthogonal axes extend across the slots to connect the gimbal portion 12 to the mounting portions 14 and to the rotor portion 10 to afford the gyro two degrees of freedom. Secured to the rotor portion 10 is a gyro wheel 26 which has the form of a short sleeve concentric with the shaft 20, the outer surface of the wheel being spherical about the center of suspension of the gyro. The assembly is housed within a generally cylindrical casing 28 with the shaft 20 extending axially. The gyroscope can if desired include either or both of the pick-off arrangements of U.S. application Ser. No. 647,549 and the aerodynamic control arrangements of U.S. application Ser. No. 647,550.

The gyro wheel 26, which is of non-magnetic metal as is the casing 28, is provided with an armature ring 30 consisting of a stack of ferrous laminations let into a slot in its outer surface. The edges of the stack of armature laminations are rounded off to correspond to the contour of the wheel 26.

Figure 2:
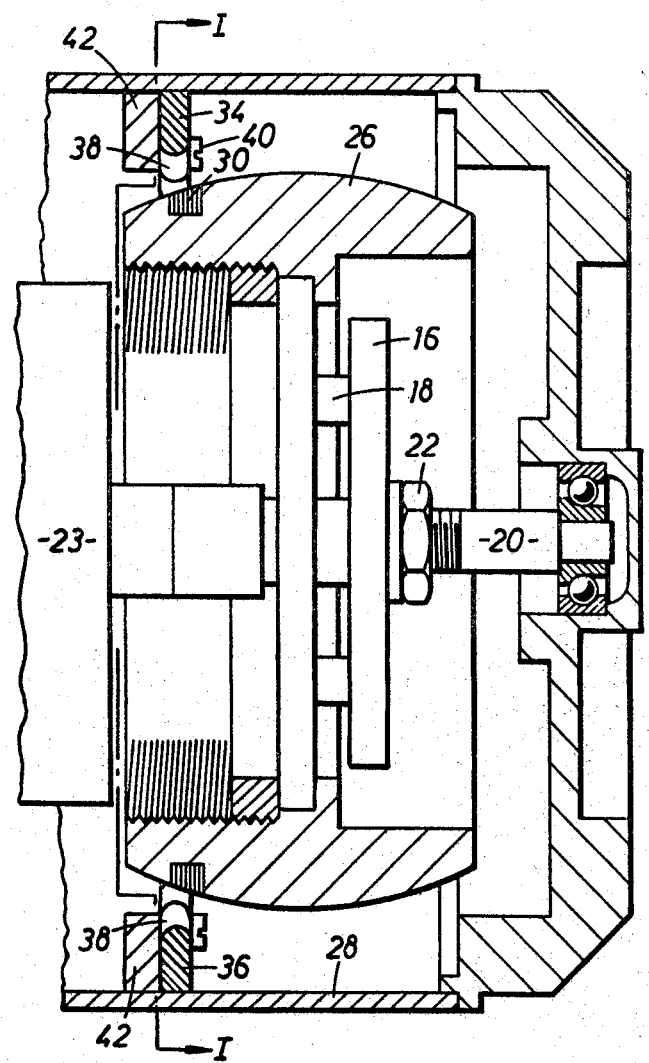
FIG. 2 is a sectional side view of the gyroscope taken on the line II—II of FIG. 1.

In the embodiment illustrated in FIGS. 1 and 2, two fixed permanent magnets 34, 36 are provided, each having the general shape of a flattened U. The magnets are at diametrically opposed positions, with the limbs 38 of each U extending radially inwards in a common plane at right angles to the axis of the driving shaft 20. This plane is related to the plane of symmetry of the armature ring 30 in such a way that the magnetic pull between each magnetic pole and the armature ring acts through the center of suspension of the gyro wheel as long as the spin axis coincides with the axis of the torque causing the wheel to spin, that is, with the driving shaft axis. The ends of the limbs 38 are very closely adjacent the armature ring 30.

The magnets 34, 36 are secured to the casing 28 in any suitable way allowing correct positioning, that is, positioning such that when the spin axis of the rotor coincides with the axis of the shaft 20 the magnetic forces act through the suspension center. The magnets are secured in the embodiment illustrated by means of bolts 40 to lugs 42 projecting inwardly from the casing wall. Shims can be inserted between the magnets and the lugs to permit any necessary adjustment.

The planes containing the center of the limbs 38 of the magnets and of the armature ring 30 are both axially displaced from the plane of symmetry of the gyro wheel 26 which contains the centre of suspension of the wheel, in such a way that the magnetic force acts through the suspension center and thus at an angle to this plane. The size of this angle is not in general critical and the armature can be at any position axially of the rotor. However, it will be appreciated that an undesired torque would result if diametrally opposite magnets were of different strength and if it were essential to avoid this the angle could be kept small or nominally zero by arranging the planes of the magnets and the armature to coincide with the plane of symmetry.

Figure 3:
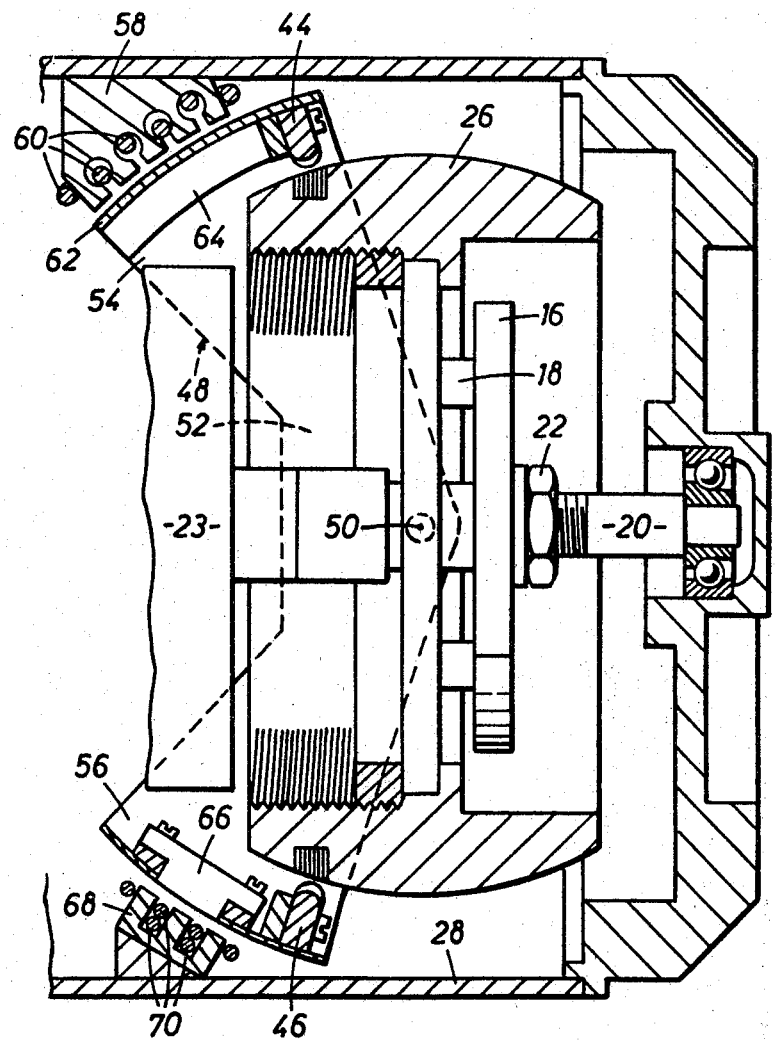
FIG. 3 is a sectional side view of a gyroscope incorporating the second embodiment of the invention.

The gyro rotor assembly and casing structure shown in FIG. 3 resemble those of the first embodiment and like parts are indicated by the reference numerals previously employed. The second magnetic means comprise a pair of permanent magnets 44, 46 of the same general form as the magnets 34, 36. The magnets 44, 46 are not however mounted directly on the casing 28 but on a carrier 48. The carrier 48 has the form of a shell cut from the surface of a sphere concentric with the center 50 of suspension of the rotor. Two opposed portions 52 of the carrier extend to the wall of the casing 28 where they are connected to the casing for pivotal rotation about an axis which passes through the center 50. The carrier 48 also has portions 54, 56 axially remote from the center 50 which support means for positioning the carrier, and thus the magnets 44, 46, and for measuring the position of the carrier respectively.

The positioning means comprise a linear induction motor having a stator core 58 of iron laminations supporting coils 60 and secured to the wall of casing 28. The surface of the core 58 towards the carrier 48 is shaped to correspond to the spherical outer surface of the carrier which is constituted as an armature in the form of a strip 62 of copper or other electrically conductive material backed by a stack 64 of iron laminations. As will be evident from FIG. 3, energizing the stator of the motor by passage of suitable electric current through the coils 60 will cause the armature to move relative to the stator in a direction to cause a tilting of the carrier 48 about its pivot axis.

The relative positions of the magnets 44, 46 and the rotor armature ring 30 are such that the carrier 48 can be moved to either side of a neutral position in which the magnetic forces act through the center 50. In the neutral position, the magnets 44, 46 function in the same way as the fixed magnets 34, 36. When the carrier is displaced from the neutral position, with the rotor spin axis and the rotor drive axis in coincidence, the magnets 44, 46 co-act with the armature 30 to apply torsion to the rotor which tends to move it to restore the relative location of the magnets and the armature. It follows that the rotor can be made to precess a desired amount by use of the torsional force applying means of the invention.

The position of the carrier 48 requires to be very precisely controlled and pick-off means for accurately monitoring its movement are accordingly provided. As shown in FIG. 3, the portion 56 of the carrier is provided with a stack 66 of iron laminations for co-operation with a pick-off element mounted on the inside of the wall of the casing 28 and comprising a stator core 68 and a pair of coils 70 wound thereon. When one of the coils 70 is suitably energized, an electric signal dependent on the position of the carrier 48 can be obtained from the other coil.

The second embodiment described can of course be modified in a variety of ways. For example, the second magnetic means could be movable otherwise than round the centre of suspension of the rotor. The magnet carrier or carriers can be moved by means other than an induction motor. Moreover, the magnetic means could be moved, as by a solenoid, from a neutral position to a single predetermined active position so that a known torque can be applied to the rotor for a given time. The pick-off means shown could be replaced by any other suitable position indicating device.

Referring to FIG. 1, the axis of the driving shaft 20 is taken as the z-axis of a co-ordinate system carried on the centre of suspension of the rotor, and the poles of the magnet 34 are regarded as symmetrically straddling the x-axis and subtending an angle $2\alpha$ at the center. The restoring torques due to the magnetic attraction exerted by each pole will then be approximately proportional to $\sin^2 \alpha$ about the x-axis and to $\cos^2 \alpha$ about the y-axis. Each pole contributes a restoring force independently of the others. It will be evident that a wide range of torsional restraint about each axis can be obtained by suitable choice of the angle $\alpha$ and of the magnetic pole strength.

The invention accordingly is limited neither to the particular rotor construction nor to the particular arrangement of magnetic elements described. The magnetic force can be derived from electro-magnets if preferred and the shape, location and number of the magnetic elements can be selected as required for each particular application. The invention can thus be embodied in a variety of ways other than as described within the scope of the invention as defined in the following claims.

We claim:
1. A gyroscope comprising:
   a casing, a gyro rotor, and means mounting said rotor in said casing;
   drive means for applying a torque about a drive axis to spin said rotor;
   said mounting means permitting angular displacement of the rotor spin axis from the drive axis about a center of suspension; and
   magnetic means for influencing the angular position of the rotor spin axis, said magnetic means comprising permanent magnet means carried by the casing and magnetizable means carried by the rotor.

2. A gyroscope as claimed in claim 1, wherein the magnetizable means comprises a stack of magnetizable laminations set in a slot in the rotor surface.

3. A gyroscope as claimed in claim 1, wherein the permanent magnet means comprises a pair of permanent magnets diametrically spaced about the rotor.

4. A gyroscope as claimed in claim 3, wherein each permanent magnet is U-shaped, the ends of the limbs thereof providing pole faces adjacent the magnetizable means.

5. A gyroscope as claimed in claim 1, wherein the permanent magnet means is fixedly carried by the casing for co-operation with the magnetizable means to influence the angular position of the rotor spin axis only when the rotor spin axis is angularly displaced from the drive axis.

6. A gyroscope as claimed in claim 5, wherein the permanent magnet means and the magnetizable means are differently spaced from the center of suspension of the rotor along the drive axis.

7. A gyroscope as claimed in claim 5, wherein the permanent magnet means and the magnetizable means are positioned so that a plane through the center of suspension of the rotor and at right angles to the drive axis passes therethrough.

8. A gyroscope as claimed in claim 1, and additionally comprising support means supporting the permanent magnet means for selective movement with respect to the casing.

9. A gyroscope as claimed in claim 8, wherein the permanent magnet means comprises a pair of permanent magnets diametrically spaced about the rotor.

10. A gyroscope as claimed in claim 9, wherein each permanent magnet is U-shaped, the ends of the limbs providing pole faces adajcent the rotor surface.

11. A gyroscope as claimed in claim 8, wherein the magnetizable means comprises a stack of magnetizable laminations set in a slot in the rotor surface.

12. A gyroscope as claimed in claim 8, wherein said support means permit movement of the permanent magnet means into a position in which the permanent magnet means co-operates with the magnetizable means to influence the angular position of the rotor spin axis only when said spin axis is angularly displaced from the drive axis.

13. A gyroscope as claimed in claim 8, wherein said support means is arranged for pivotal rotation about an axis at right angles to the drive axis and passing through the center of suspension of the rotor.

14. A gyroscope as claimed in claim 13, and additionally comprising electric drive means for pivoting said support means.

15. A gyroscope as claimed in claim 14, wherein said electric drive means comprises a linear induction motor.

16. A gyroscope as claimed in claim 14, and additionally comprising electric pick-off means for measuring the position of said support means.

References Cited

UNITED STATES PATENTS

| 1,998,948 | 4/1935 | Wittkuhns et al. | 74—5.6 XR |
| 2,417,573 | 3/1947 | Strother | 74—5.6 XR |
| 2,948,155 | 8/1960 | Burkam | 74—5.6 |
| 3,107,540 | 10/1963 | Curriston | 74—5.4 |
| 3,176,523 | 4/1965 | Amlie et al. | 74—5.6 |
| 3,260,122 | 7/1966 | Rocks | 74—5.4 |
| 3,347,105 | 10/1967 | Polushkin et al. | 74—5.6 |
| 3,354,726 | 11/1967 | Krupick et al. | 74—5 |

FRED C. MATTERN, Jr., Primary Examiner

F. D. SHOEMAKER, Assistant Examiner

U.S. Cl. X.R.

74—5.6, 5.46